(12) United States Patent
Eman-Henshaw

(10) Patent No.: US 11,148,598 B1
(45) Date of Patent: Oct. 19, 2021

(54) TRUCK BED EXTENSION SYSTEM AND METHOD OF USE

(71) Applicant: Francis Eman-Henshaw, Richmond, TX (US)

(72) Inventor: Francis Eman-Henshaw, Richmond, TX (US)

( * ) Notice: Subject to any disclaimer, the term of this patent is extended or adjusted under 35 U.S.C. 154(b) by 0 days.

(21) Appl. No.: 15/887,912

(22) Filed: Feb. 2, 2018

Related U.S. Application Data

(60) Provisional application No. 62/458,614, filed on Feb. 14, 2017.

(51) Int. Cl.
| | | |
|---|---|---|
| *B60J 7/00* | (2006.01) | |
| *B60R 5/04* | (2006.01) | |
| *B62D 33/027* | (2006.01) | |
| *B60P 1/00* | (2006.01) | |
| *B60R 9/06* | (2006.01) | |

(52) U.S. Cl.
CPC ............. *B60R 5/041* (2013.01); *B60P 1/003* (2013.01); *B60R 9/06* (2013.01); *B62D 33/027* (2013.01)

(58) Field of Classification Search
CPC ...... B60P 3/40; B60P 7/0807; B62D 33/0273; B62D 33/023; B62D 33/037; B60J 7/141; B60R 11/06; B60R 9/00
See application file for complete search history.

(56) References Cited

U.S. PATENT DOCUMENTS

| | | | | |
|---|---|---|---|---|
| 5,820,190 A | * | 10/1998 | Benner | B60P 3/14 296/26.09 |
| 5,934,725 A | * | 8/1999 | Bowers | B60P 3/40 296/26.09 |
| 5,938,262 A | * | 8/1999 | Mills | B60P 3/40 296/26.09 |
| 5,944,371 A | * | 8/1999 | Steiner | B60R 5/04 296/26.09 |
| 5,988,722 A | * | 11/1999 | Parri | B60P 1/003 224/403 |
| 6,065,792 A | * | 5/2000 | Sciullo | B60P 1/003 296/26.09 |
| 6,120,075 A | * | 9/2000 | Terry | B60P 1/003 224/403 |
| 6,193,294 B1 | * | 2/2001 | Disner | B62D 33/0273 108/44 |
| 6,244,646 B1 | * | 6/2001 | Wheeler, III | B60P 3/14 296/26.01 |
| 6,250,702 B1 | * | 6/2001 | Eipper | B60N 3/001 108/44 |
| 6,283,526 B1 | * | 9/2001 | Keough | B60P 1/003 296/183.1 |

(Continued)

*Primary Examiner* — Kiran B Patel
(74) *Attorney, Agent, or Firm* — Leavitt Eldredge Law Firm

(57) ABSTRACT

A truck bed extension system, includes a truck bed; an extension, having a frame with a first sidewall and a second sidewall; a base extending from the first sidewall to the second sidewall; and an interior cavity formed by the frame and the base; a mounting apparatus, having a first rail mounted to the first sidewall; a second rail mounted to the second sidewall; a first slide mounted to a first truck bed wall; and a second slide mounted to a second truck bed wall; the first rail is in sliding communication with the first slide; the second rail is in sliding communication with the second slide; and the extension slides into the truck bed via the mounting apparatus.

9 Claims, 9 Drawing Sheets

(56) References Cited

U.S. PATENT DOCUMENTS

| | | | | |
|---|---|---|---|---|
| 6,328,364 B1* | 12/2001 | Darbishire | B60P 1/003 | 296/26.09 |
| 6,398,283 B1* | 6/2002 | Knudtson | B60P 1/003 | 296/26.09 |
| 6,503,036 B1* | 1/2003 | Bequette | B60P 3/40 | 410/121 |
| 6,516,983 B2* | 2/2003 | Sotiroff | B60J 5/047 | 224/281 |
| 6,601,899 B2* | 8/2003 | Kiester | B60P 3/40 | 224/496 |
| 6,648,569 B2* | 11/2003 | Douglass | B60P 1/003 | 410/46 |
| 6,659,524 B1* | 12/2003 | Carlson | B60P 1/003 | 296/26.09 |
| 6,659,525 B2* | 12/2003 | Delavalle | B60R 5/041 | 296/26.08 |
| 6,712,415 B1* | 3/2004 | Darbishire | B60R 11/00 | 296/37.1 |
| 6,758,508 B2* | 7/2004 | Weyhrich | B62D 33/02 | 296/100.18 |
| 6,840,558 B1* | 1/2005 | Darbishire | B60P 1/003 | 248/503 |
| 6,860,536 B1* | 3/2005 | Schimunek | B60P 1/003 | 296/26.09 |
| 6,863,328 B2* | 3/2005 | Kiester | B62D 33/08 | 296/24.4 |
| 6,871,895 B2* | 3/2005 | Kiester | B60P 7/14 | 296/183.1 |
| 6,921,120 B1* | 7/2005 | Ervin | B60P 3/40 | 296/26.02 |
| 7,090,275 B2* | 8/2006 | Pero | B60P 1/003 | 296/26.09 |
| 7,121,603 B2* | 10/2006 | Stevenson | B60P 1/003 | 296/26.09 |
| 7,175,060 B1* | 2/2007 | Carpenter | B60P 1/003 | 224/281 |
| 7,237,817 B2* | 7/2007 | Kobylski | B60P 1/003 | 296/26.01 |
| 7,338,104 B1* | 3/2008 | Bejin | B60P 1/003 | 224/403 |
| 7,393,036 B2* | 7/2008 | Bastian | B60R 5/04 | 296/26.09 |
| 7,416,234 B2* | 8/2008 | Bequette | B60P 1/003 | 296/26.08 |
| 7,445,263 B1* | 11/2008 | Bluhm | B60P 1/003 | 296/26.09 |
| 7,455,312 B2* | 11/2008 | Senatore | B60D 1/54 | 280/475 |
| 7,530,618 B2* | 5/2009 | Collins | B60P 1/003 | 224/403 |
| 7,543,872 B1* | 6/2009 | Burns | B60P 1/003 | 296/26.08 |
| 7,976,264 B1* | 7/2011 | Pope | B60P 1/431 | 414/480 |
| 8,087,709 B2* | 1/2012 | Jackson, Sr. | B62D 33/08 | 296/26.08 |
| 8,240,527 B1* | 8/2012 | Casselton | B60R 9/065 | 224/404 |
| 8,328,263 B1* | 12/2012 | Alexander | B60R 5/041 | 296/26.09 |
| 9,238,429 B2* | 1/2016 | Bluhm | F16D 63/008 | |
| 9,321,402 B2* | 4/2016 | Nedelman | B60R 7/02 | |
| 9,387,891 B2* | 7/2016 | Richins | B60P 1/00 | |
| 9,789,800 B2* | 10/2017 | Thygesen | B62D 33/08 | |
| 9,956,996 B2* | 5/2018 | Astrike | B62D 33/03 | |
| 10,017,098 B2* | 7/2018 | Ronsen | B60P 3/343 | |
| 10,053,020 B2* | 8/2018 | Krishnan | B60R 9/06 | |
| 10,308,156 B2* | 6/2019 | Adams | B60P 1/003 | |
| 10,479,418 B1* | 11/2019 | Patel | G05D 1/0088 | |
| 10,710,533 B2* | 7/2020 | DeBerti | B60R 5/041 | |
| 10,919,428 B2* | 2/2021 | Wallace | B60P 1/003 | |
| 10,974,086 B2* | 4/2021 | Nessel | A62C 99/0081 | |
| 2002/0037203 A1* | 3/2002 | Kiester | B62D 33/08 | 410/129 |
| 2002/0105201 A1* | 8/2002 | Melotik | B60R 5/041 | 296/26.09 |
| 2002/0109368 A1* | 8/2002 | Mink | B60P 1/003 | 296/26.13 |
| 2002/0140245 A1* | 10/2002 | Coleman, II | B60R 5/04 | 296/26.09 |
| 2002/0180231 A1* | 12/2002 | Fox | B62D 33/0273 | 296/26.01 |
| 2003/0127874 A1* | 7/2003 | McLaughlin | B60R 5/041 | 296/26.09 |
| 2003/0141733 A1* | 7/2003 | Burg | B60R 5/041 | 296/26.09 |
| 2003/0146636 A1* | 8/2003 | Keller | B60P 1/003 | 296/26.09 |
| 2004/0007889 A1* | 1/2004 | Hebert | B60P 1/003 | 296/26.09 |
| 2005/0036849 A1* | 2/2005 | Kiester | B60P 3/40 | 410/129 |
| 2005/0194816 A1* | 9/2005 | Kiester | B62D 33/02 | 296/182.1 |
| 2006/0061116 A1* | 3/2006 | Haaberg | B60P 3/14 | 296/37.6 |
| 2007/0210599 A1* | 9/2007 | Arnold | B60P 1/003 | 296/26.09 |
| 2009/0096237 A1* | 4/2009 | Gagliano | B60P 1/003 | 296/26.1 |
| 2013/0341949 A1* | 12/2013 | Bernthisel | B62D 33/0273 | 296/26.09 |
| 2015/0048642 A1* | 2/2015 | Williams | F16B 7/105 | 296/26.09 |
| 2018/0134205 A1* | 5/2018 | Karumuri | B62D 33/0273 | |
| 2018/0201107 A1* | 7/2018 | Lawson | B60J 7/198 | |
| 2019/0308674 A1* | 10/2019 | Crawford | B60P 7/0815 | |

* cited by examiner

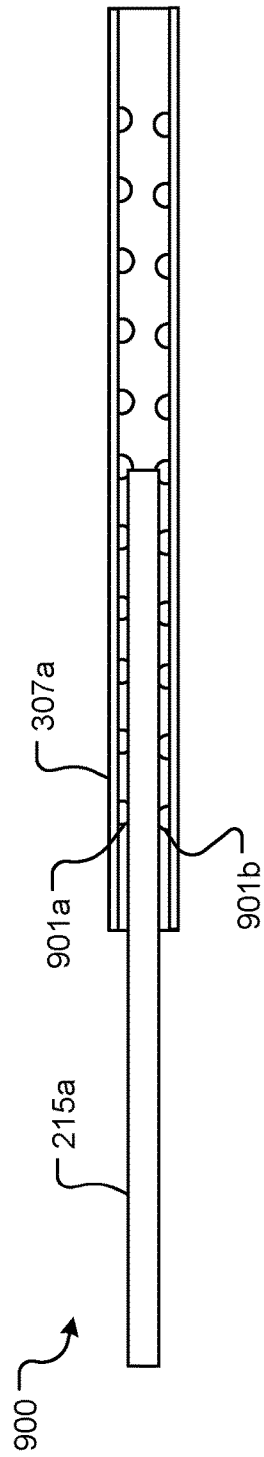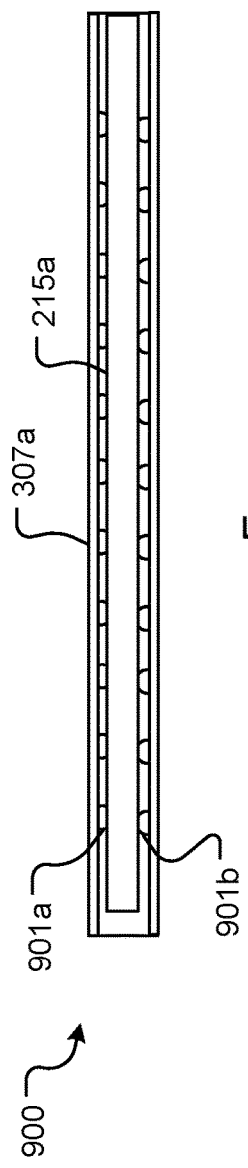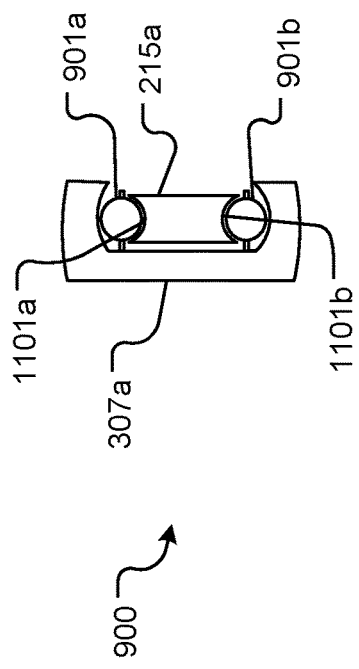

TRUCK BED EXTENSION SYSTEM AND METHOD OF USE

BACKGROUND

1. Field of the Invention

The present invention relates generally to a truck bed system for expanding the cargo carrying capacity of a truck.

2. Description of Related Art

Truck bed systems are well known in the art and are effective means to transport cargo. For example, FIG. 1 depicts a conventional tuck 101 having a cab 103 and a truck bed 105. During use, cargo is placed in truck bed 105 for transportation.

One of the problems commonly associated with system 101 is inadequate cargo space. For example, truck bed 105 is not always large enough to carry all necessary cargo required for a specific task. In addition, using truck 101 to pull trailers can be cumbersome and difficult to maneuver when the trailer is not needed.

Accordingly, although great strides have been made in the area of truck bed systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 9 and 10 are side views of an exemplary embodiment of a mounting apparatus of FIGS. 3 and 4;

FIG. 11 is a cross sectional view of the mounting apparatus of FIGS. 9 and 10;

Figure 1:
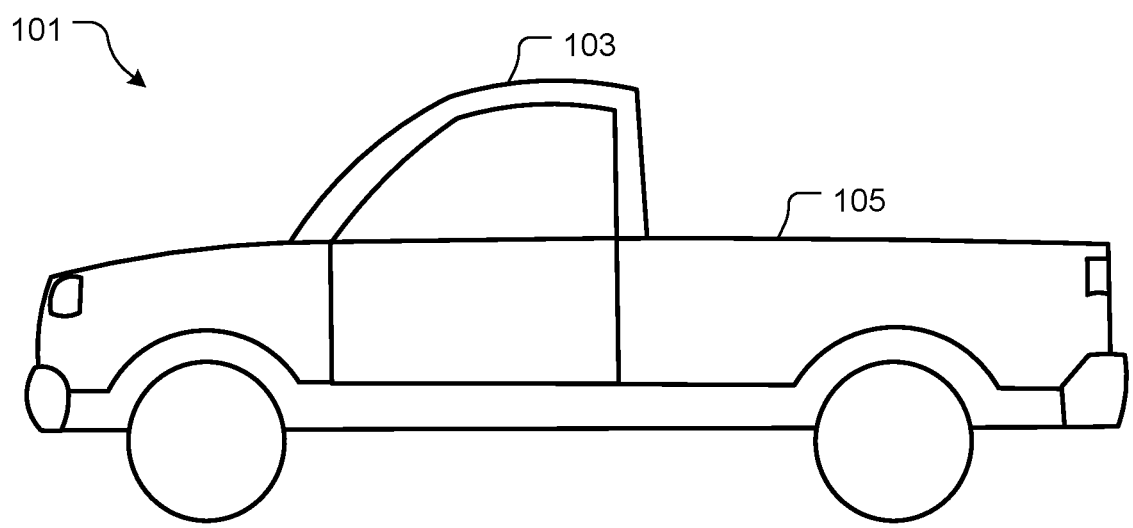
FIG. 1 is a side view of a common truck bed system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional truck bed. Specifically, the present invention provides a means to extend the cargo space associated with truck bed. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
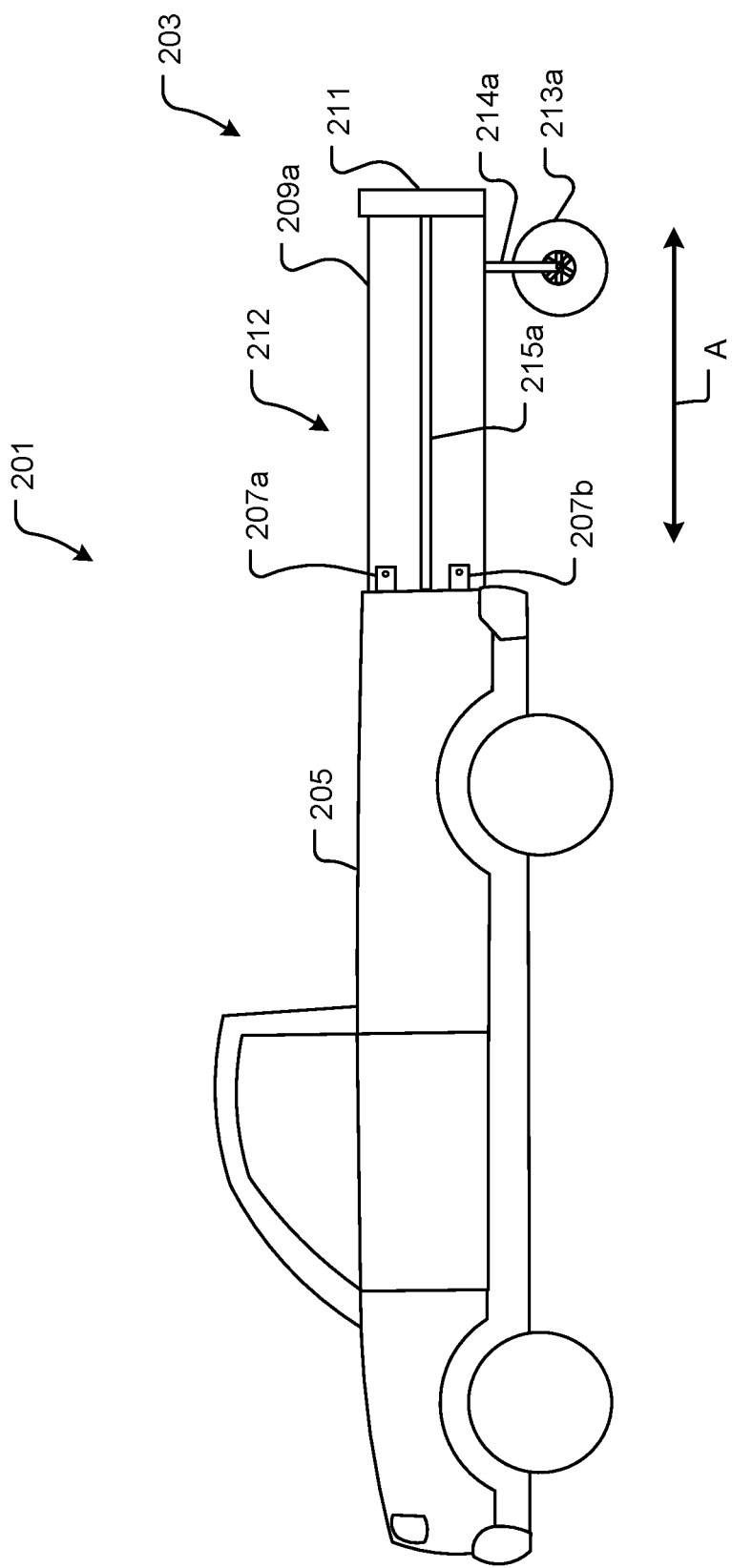
FIG. 2 is a side view of a truck bed system in accordance with a preferred embodiment of the present application.
Figure 3:
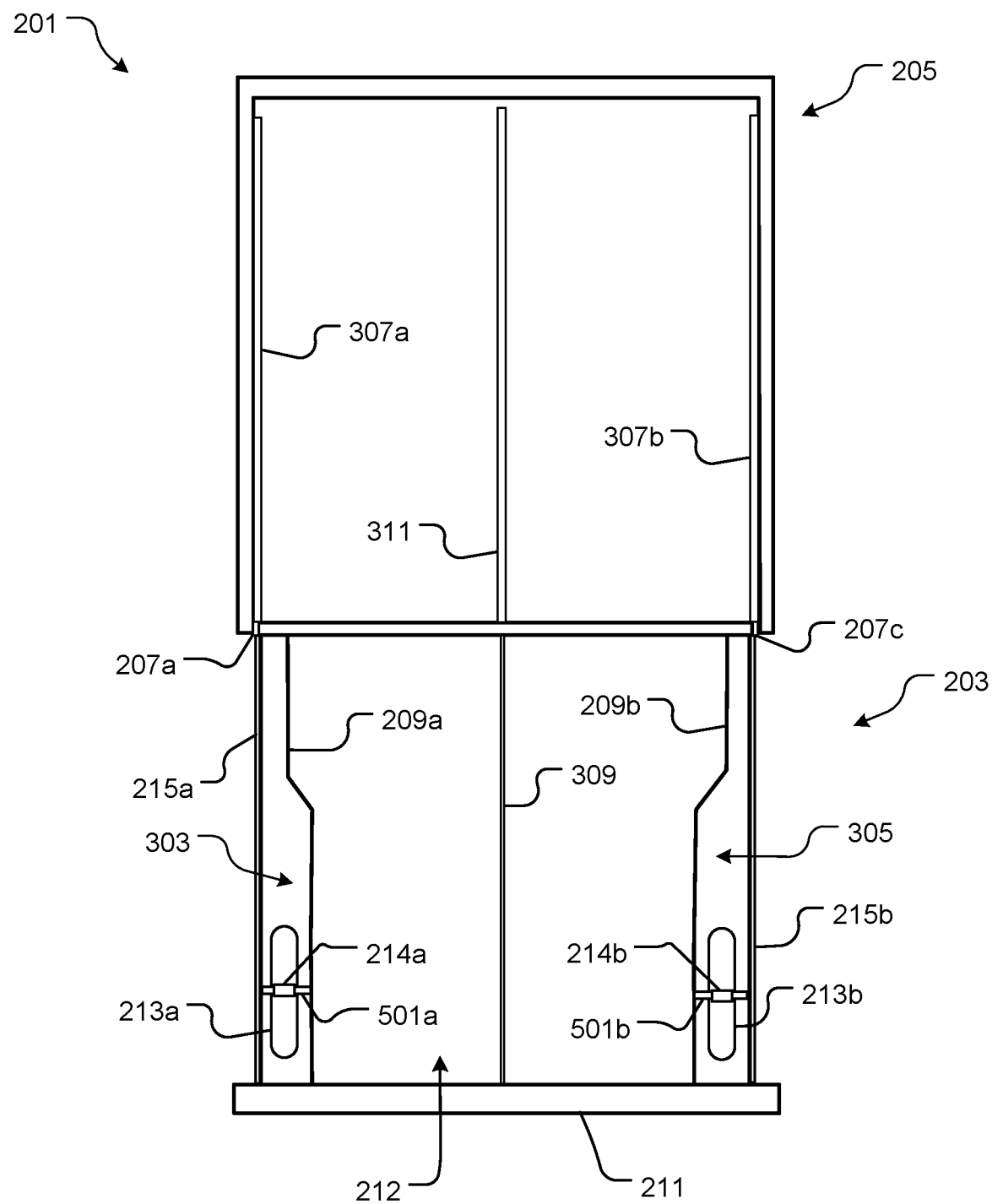
FIG. 3 is a top view of the truck bed system of FIG. 2.
Figure 4:
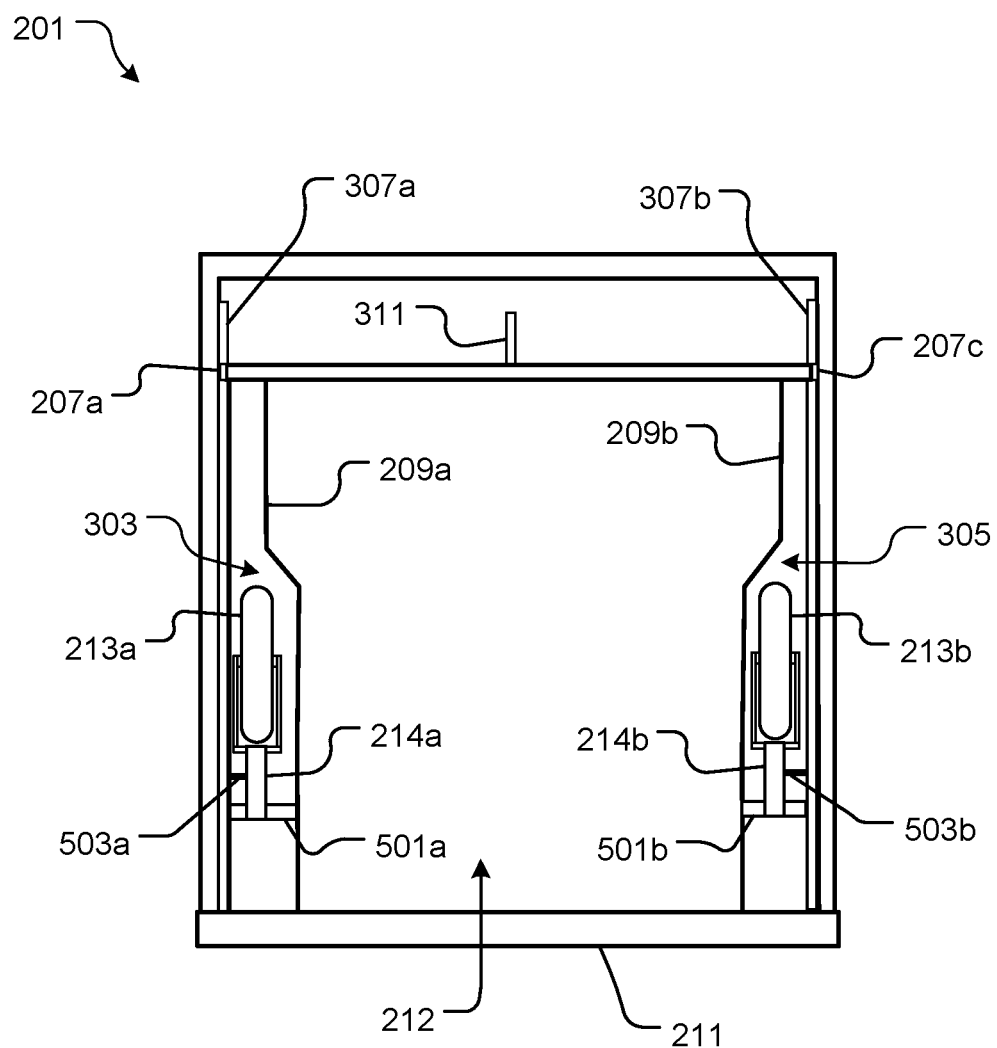
FIG. 4 is a top view of the truck bed system of FIG. 2.

Referring now to the drawings wherein like reference characters identify corresponding or similar elements throughout the several views, FIG. 2-4 depict various views of a truck bed system 201 in accordance with a preferred embodiment of the present application. It will be appreciated that system 201 overcomes one or more of the above-listed problems commonly associated with conventional truck bed systems.

In the contemplated embodiment, system 201 includes a truck bed extension 203 extended from a truck bed 205 and secured thereto by one or more locking devices 207a-d. Extension 203 traverses relative to bed 205, as indicated with line A. Locking devices 207a-d are configured to rigidly secure extension 203 and truck bed 205 together, when extension 203 is in an extended position, as shown in FIG. 3.

In the preferred embodiment, extension 203 includes a frame with sidewalls 209a, 209b and a door 211 pivotally attached to sidewalls 209a, 209b. Door 211 is configured to provide access to an interior cavity 212 of extension 203 formed between sidewalls 209a, 209b.

Extension 203 further includes two wheels 213a, 213b secured to sidewalls 209a-b by arms 214a, 214b. Sidewalls 209a, 209b can further include interior compartments 303, 305, wherein wheels 213a, 213b are stored when not in use (as shown in FIG. 4). In the contemplated embodiment, wheels 213a, 213b extend from compartments 303, 305 to the ground surface via arms 214a, 214b.

Figure 5:
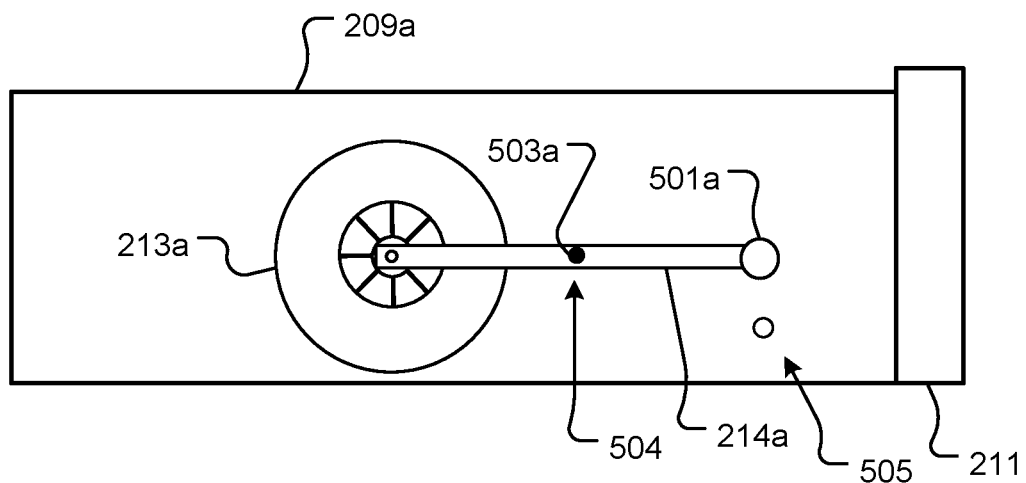
FIGS. 5 and 6 are side views of a wheel extension of the present invention.
Figure 6:
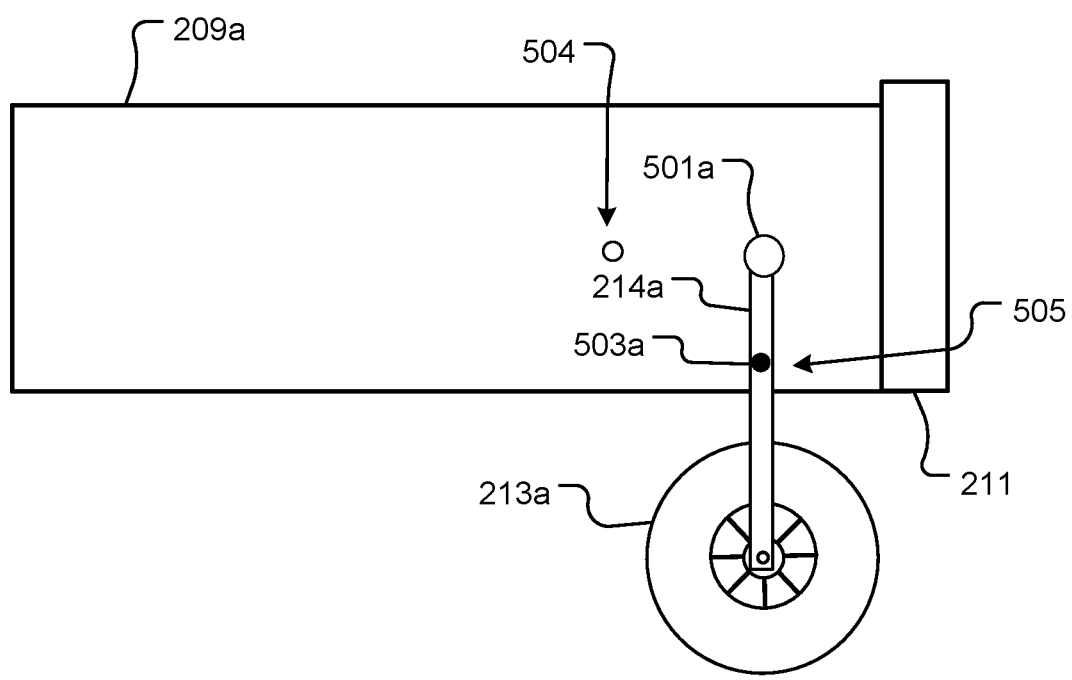

As shown in FIGS. 5-8, two contemplated means of extending and retracting wheels 213a, 213b are shown. In FIGS. 5 and 6, in one contemplated embodiment, wheels 213a, 213b are rotationally secured to axis bars 501a, 501b via arms 214a, 214b. Arms 214a, 2145 are configured to rotate relative to axis bars 501a, 501b, thereby moving wheels 213a, 213b in and out of compartments 303, 305. In this embodiment, wheels 213a, 213b are secured in a retracted position via retaining pins 503a, 503b. Pins 503a, 503b are inserted through sidewalls 209a, 209b at a first location 504 and into arms 214a, 214b. Similarly, it is contemplated that insertion of retaining pins 503a, 503b at a second location 505 can secure wheels 213a, 213b in an extended position.

Figure 7:
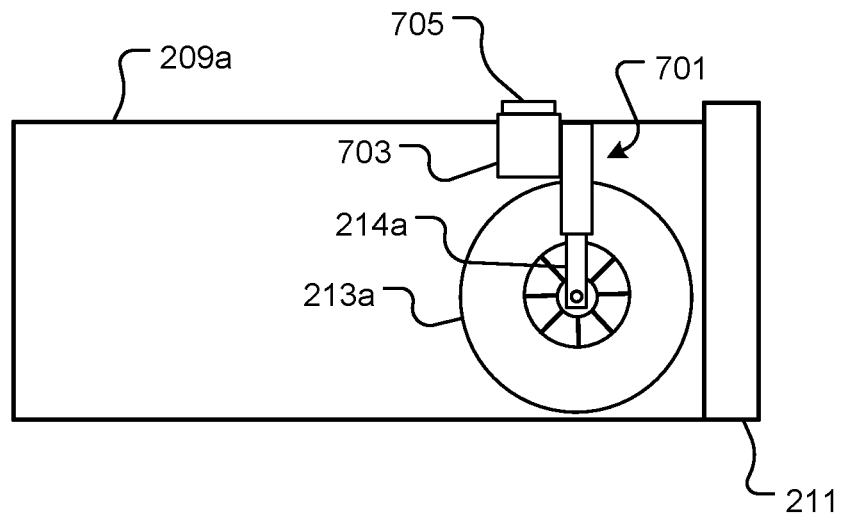
FIGS. 7 and 8 are side views of an alternative wheel extension of the present invention.
Figure 8:
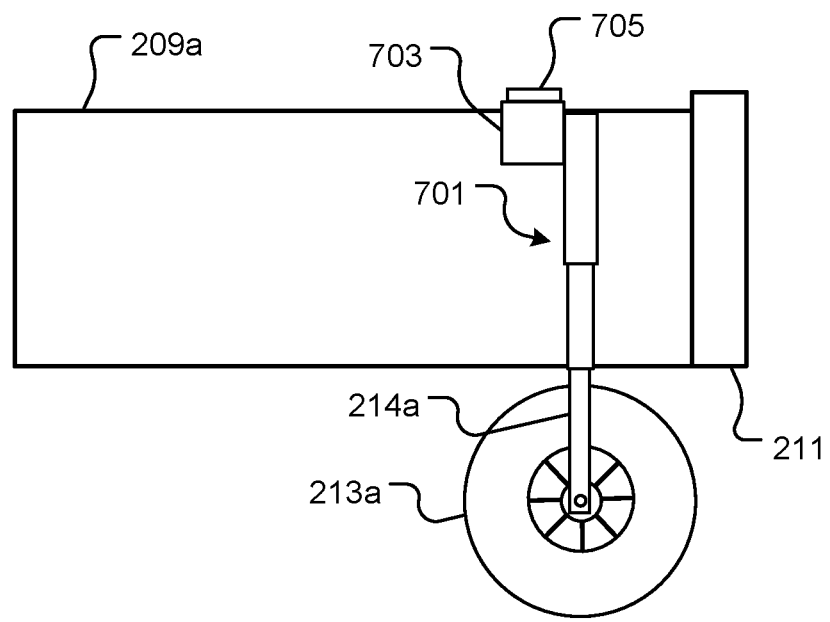

In an alternative embodiment, as shown in FIGS. 7 and 8, wheel 213a is attached to a hydraulic lift apparatus 701 via arm 214a. Hydraulic lift apparatus 701 is used to raise and lower wheel 213a from compartment 303. It is contemplated that hydraulic lift apparatus 701 can be connected to a motor 703 with a control panel 705. Control panel 705 is used to activate motor 703, thereby raising wheel 213a into compartment 303.

In the preferred embodiment of system 201, extension 203 is extendable from bed 205 via a mounting apparatus 900. Mounting apparatus 900 includes two rails 215a, 215b mounted on outside surfaces of sidewalls 209a, 209b. Mounting apparatus 900 further includes two slides 307a, 307b mounted on the interior of bed 205. It is further contemplated that a third rail 309 can be mounted on the bottom surface of extension 203 and a third slide 311 can be mounted on the top of bed 205. The plurality of rails are configured to slidingly engage with the plurality of slides, thereby allowing extension 203 to extend from bed 205.

In FIGS. 9-11, an exemplary embodiment of mounting apparatus 900 is shown. It is contemplated that rail 215a can engage with slide 307a via a plurality of rollers 901a-b. Rail 215a can have one or more contoured ends 1101a, 1101b for engaging with rollers 901a, 901b, thereby allowing rail 215a to roll relative to slide 307a. It should be appreciated that a variety of sliding mechanisms could be used in alternative embodiments to achieve the same functionality of apparatus 900.

Figure 12:
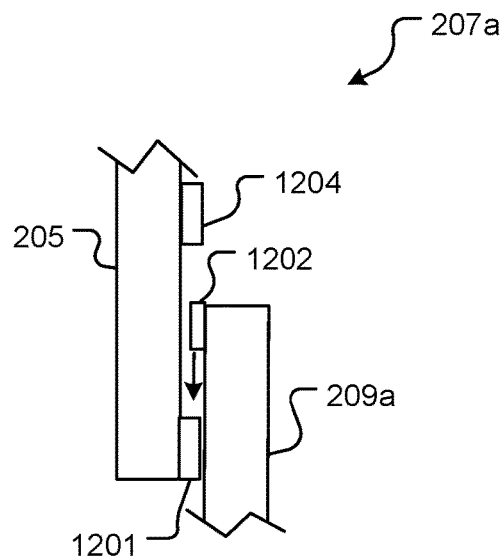
FIGS. 12 and 13 are top views of a locking mechanism of FIG. 2.
Figure 13:
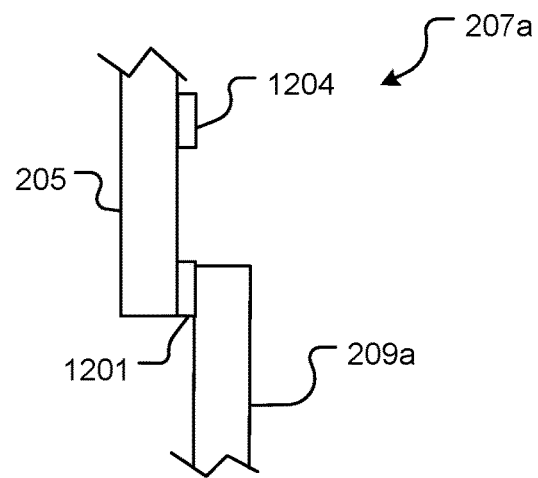
Figure 14:
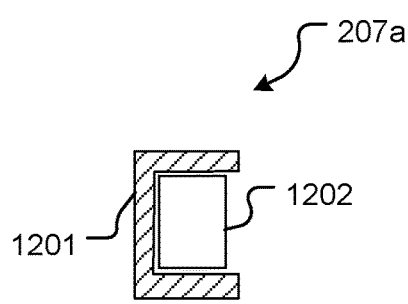
FIG. 14 is a cross sectional view of the locking mechanism of FIGS. 12 and 13.

In the preferred embodiment, extension 203 is secured in a locked position via the locking mechanisms 207a-d. As shown in FIGS. 12-14, one contemplated locking mechanism 207a includes a first attachment 1201 connected to the interior of truck bed 205 and a second attachment 1202 connected to the exterior of sidewall 209a. Attachments 1201 and 1202 are configured to securely slide together, as shown in FIG. 14. It is contemplated that locking mechanism 207a can further include a third attachment 1204, identical in shape to attachment 1201, and configured to receive attachment 1202 at a second position. It should be appreciated that attachment 1204 would allow for securing extension 203 at a second position. It should further be appreciated that any means of securing sidewall 209a to bed 205, such as clasps or hooks, could be used in alternative embodiments.

Figure 15:
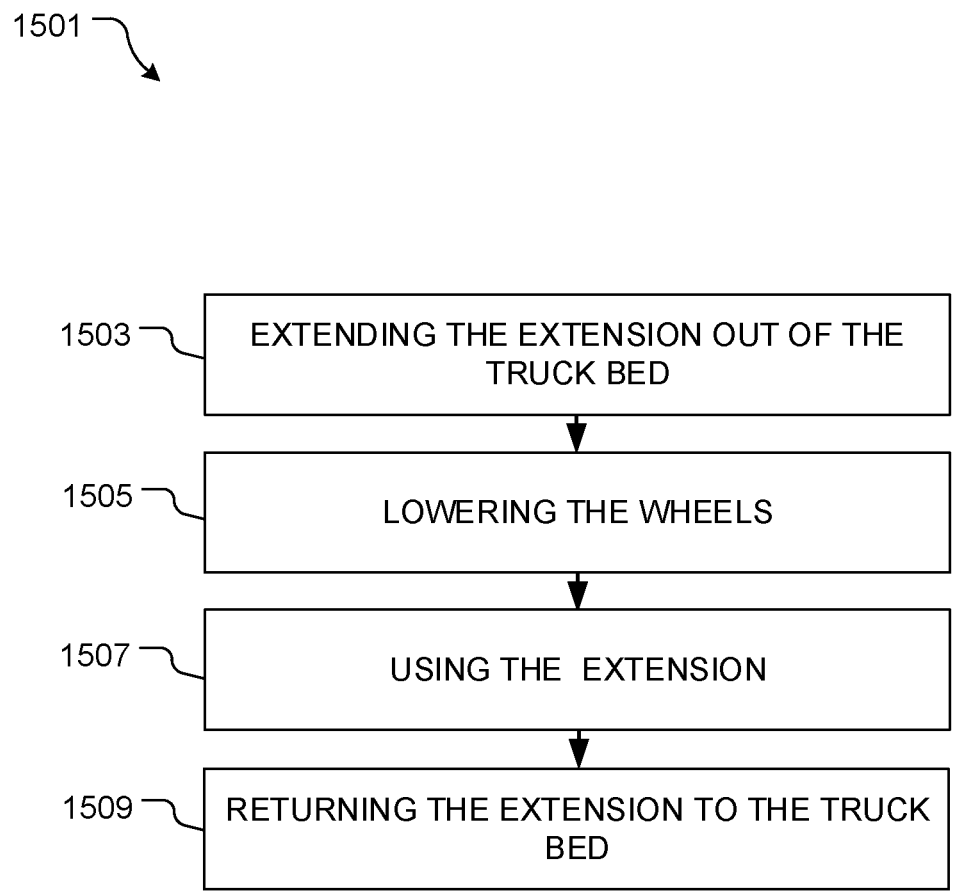
FIG. 15 is a flowchart of the method of use of FIG. 2.

In FIG. 15, a flowchart 1501 depicts the method of use of system 201. During use, extension 203 is extended out of bed 205 and wheels 213a-b are lowered to the ground surface, as shown with boxes 1503, 1505. Extension 203 is used to transport cargo as necessary for the user, as shown with box 1507. Wheels 213a-b are retracted back into the sidewalls and extension 203 is retracted back into bed 205 until needed again, as shown with box 1509.

It should be appreciated that one of the unique features believed characteristic of the present application is the ability of extension 203 to be completely retained within bed 205 via the mounting apparatus 900. It should be understood that this feature allows for extension 203 to be available at any time, while remaining out of the way during non-use.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A truck bed extension system, comprising:
   a truck bed;
   an extension apparatus configured to traverse relative to the truck bed, the extension apparatus having:
   a frame with a first sidewall and a second sidewall;
   a base extending from the first sidewall to the second sidewall; and an interior cavity formed by the frame and the base;
   a mounting apparatus configured to secure the extension apparatus to the truck bed, the mounting apparatus having:
   a first rail mounted to the first sidewall;
   a second rail mounted to the second sidewall;
   a first slide mounted to a first truck bed wall;
   a second slide mounted to a second truck bed wall;
   a hydraulic lift extending from the first sidewall;
   a wheel attached to the hydraulic lift; and
   a compartment configured to receive the wheel when lifted via the hydraulic lift;
   wherein the hydraulic lift is configured to extended the wheel to a ground surface;
   wherein the first rail is in sliding communication with the first slide; and
   wherein the second rail is in sliding communication with the second slide; and
   wherein the extension apparatus traverses relative to the truck bed via the mounting apparatus.

2. The system of claim 1, wherein the extension apparatus further comprises: a door pivotally attached to the first sidewall and the second sidewall.

3. The system of claim 2, wherein the door is configured to provide access to the interior cavity.

4. The system of claim 1, further comprising:
   a first wheel attached the first sidewall by an arm;
   wherein the arm is configured to extend the wheel to a ground surface.

5. The system of claim 4, wherein the first sidewall further comprises:
   wherein the arm is pivotally attached to the sidewall;
   a compartment configured receive the wheel when the arm pivots; and
   a retaining pin configured to be inserted through the sidewall and the arm;
   wherein the wheel is secured within the compartment by the retaining pin.

6. The system of claim 1, further comprising:
a locking device, having:
a first attachment secured to the truck bed; and a second attachment secured to the extension;
wherein the first attachment and the second attachment engage to lock the extension in place.

7. The system of claim 1, further comprising:
a third rail mounted to a bottom surface of the base; and
a third slide mounted on a top surface of a bottom of the truck bed;
wherein the third rail and the third slide are in sliding communication.

8. The system of claim 1, wherein the arm is pivotally attached within the interior compartment and is configured to pivot the wheel into the interior compartment.

9. The system of claim 1, wherein the extension apparatus further comprises:
a hydraulic lift secured within the interior compartment;
wherein the arm is attached to the hydraulic lift;
wherein the hydraulic lift is configured to raise the wheel into the interior compartment.

* * * * *